United States Patent Office 3,186,848
Patented June 1, 1965

3,186,848
PHOTOGRAPHIC GELATIN LAYER CONTAINING PHOSPHONITRILE DICHLORIDES AS HARDENING AGENTS
Jozef Frans Willems, Wilrijk-Antwerp, and Marcel Nicolas Vrancken, Berchem-Antwerp, Belgium, assignors to Gevaert Photo-Producten N.V., Mortsel, Belgium, a Belgian company
No Drawing. Filed Dec. 18, 1961, Ser. No. 160,255
Claims priority, application Belgium, Dec. 19, 1960, 40,307, Patent 598,272
3 Claims. (Cl. 96—111)

The present invention relates to an improved method for hardening proteins and proteinaceous substances, more particularly gelatin, and especially for the hardening of gelatin layers in material for use in photographic reproduction purposes.

It is generally known to harden soluble or fusible macro-molecular products after shaping which allows coupling the special properties of the starting materials with a lower solubility and a higher thermostability.

Thus in the case of gelatin in photographic emulsion layers, it is important to harden the gelatin in order to render it more resistant to warm aqueous solutions with widely varying pH-values. Indeed, an unhardened gelatin layer softens even at a temperature as low as 30° C. and then loses its firmness, whereas gelatin-containing emulsion layers in photographic materials have to be resistant to treatments at relatively high temperatures in successive baths which widely vary in pH.

Where the starting materials are proteinaceous, such as, e.g., gelatin, casein, zein, collagen, they may be hardened by treatment with metal salts or organic compounds whereby the finished material obtains a lower solubility, a lower water-absorption and a higher thermostability.

Of these metal salts may be mentioned, e.g., chromium, aluminium and zirconium salts.

Among organic products known in this connection may be mentioned, e.g., aldehydes such as formaldehyde, acetaldehyde, acrolein, glyoxal and derivatives thereof, mixtures of an aliphatic aldehyde and an aromatic compound the nucleus of which bears at least one hydroxyl group such as phenol, resorcinol and resorcyl aldehyde; compounds having two or more reactive groups which thus can cross-link the polypeptide chain, such as diketones, polyanhydrides, polyepoxides, and compounds having at least two ethylene-imino groups (French patent specification 1,252,873); reaction products of macromolecular compounds having amino- and/or hydroxyl groups with some classes of unsaturated aliphatic compounds having carboxyl groups (French patent specifications 1,165,518 and 1,234,740 and 75,373, first addition to French patent specification 1,165,518), high-molecular polysaccharides having secondary alcohol groups oxidized to aldehyde groups (French patent specification 1,194,285); and well-defined classes of sulfofluorides (Belgian patent specifications 571,228, 571,229 and 590,-302).

The hitherto known hardening agents, however, do not always give satisfactory results. The metal salts have the property of reacting very quickly, so that in adding the required quantity for obtaining the desired hardening, there is always the risk that the protein solution will coagulate before coating or shaping.

Hardening agents, such as formaldehyde, are partly volatilized when drying the materials so that an accurate addition is very difficult to achieve.

Moreover, the known hardening agents generally act slowly, so that a long storage is necessary in order to attain a sufficiently stabilized state of hardening and/or they require an intense heating to reach the necessary degree of hardening, which when using photographic silver halide emulsion layers may give rise to a reduction in sensitivity and to fog formation.

It has now been found that a very good hardening of proteinaceous materials is obtained without involving the above disadvantages, by using as hardening agents trimers and/or tetramers of phosphonitrile dichloride which correspond to the following formulae:

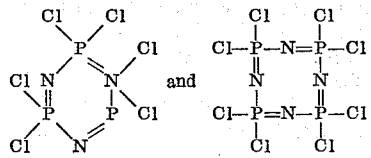

These products are marketed by Albright & Wilson Ltd., London.

It is possible to obtain the required hardening by the addition of the specified hardening agents to solutions of proteins, without influencing the physical properties of the solution before coating or during shaping.

For applying the method according to the invention, the compounds according to the above formulae can be added either to the protein solution, more particularly to the gelatin solution, or to the photographic emulsion before coating. They also can be incorporated by immersing the proteinaceous mass in a solution of one of these products.

After drying, the coated sheets, layers or articles are stored for some time in order to allow the hardening reaction to take place. In many cases a storage time from 2 to 5 days suffices.

The pH of the mixture before coating or during storage influences the hardening reaction. Although the hardening is also possible at low pH, advantage can be taken, in the case of gelatin, of keeping the pH neutral or slightly alkaline in order to obtain a rapid and intense hardening.

According to the material to be hardened, the desired hardening, the way of drying, the pH, the amounts of hardening agents used according to the invention can vary within wide limits.

For the hardening of gelatin layers in photographic materials by means of the above phosphonitrile dichlorides, an amount of 1 to 5% based on the weigth of the dry gelatin suffices to obtain the desired effect.

According to the invention, gelatin layers are obtained which have a good resistance to scratching and a swelling power, markedly lower as usual. They possess moreover a markedly increased resistivity to mechanical damages and a higher softening point or melting point in aqueous solutions. This is of special importance for photographic emulsion layers and for other auxiliary layers containing gelatin such as protective layers, antihalation layers, backing layers and filter layers since the improvement of the physical properties permits a safe treatment of the photographic material in the treating baths.

The following examples illustrate the invention.

*Example 1*

To 100 cm.³ of a 5% aqueous solution of gelatin, 5 cm.³ of a 5% solution of tri(phosphonitrile dichloride) in ethanol are added. The gelatin solution is coated onto glass-plates, solidified and dried. After some weeks of storing at room temperature, the thus obtained layers resist to a treatment in boiling water. A gelatin layer to which no hardening agent has been added easily dissolves at 35° C.

*Example 2*

To 100 cm.³ of a 5% aqueous solution of gelatin, 5 cm.³ of a 5% solution of tetra(phosphonitrile dichloride)

in ethanol are added. The gelatin solution is coated onto glass-plates, solidified and dried. After a storage for 36 h. at 50° C. the thus obtained layers resist to a treatment in water of 100° C. A gelatin layer to which no hardening agent has been added easily dissolves at 35° C.

*Example 3*

To 1 kg. of a contrasty photographic gelatino-silver halide emulsion comprising 75 g. of gelatin, 75 cm.$^3$ of a 5% solution of tri(phosphonitrile dichloride) in ethanol are added. This emulsion is coated onto film, solidified, dried and stored for some weeks at room temperature. The emulsion layer resists now well to successive treatments in aqueous solutions with widely varying pH, e.g., of from 4 to 10, and increased temperature, e.g., of from 60° to 70° C.

A similar emulsion layer, however, to which no hardening agent has been added easily dissolves at 35° C.

*Example 4*

To 1 kg. of a solution for being applied as backing layer onto photographic film and comprising 80 g. of gelatin, 50 cm.$^3$ of a 5% solution of tri(phosphonitrile dichloride) in ethanol are added. The solution is coated onto film, solidified, and dried. Already after some weeks of storing, the thus obtained layer resists to mechanical damage when treated in photographic baths.

We claim:
1. A light-sensitive photographic material carrying a gelatin layer containing 2–7%, based on the weight of gelatin, of a compound selected from the group consisting of tri(phosphonitrile dichloride) and tetra(phosphonitrile dichloride).
2. A photographic gelatino silver halide emulsion layer containing 2–7%, based on the weight of the gelatin, of a compound selected from the group consisting of tri(phosphonitrile dichloride) and tetra(phosphonitrile dichloride).
3. A photographic gelatin containing backing layer comprising 2–7%, based on the weight of the gelatin, of a compound selected from the group consisting of tri(phosphonitrile dichloride) and tetra(phosphonitrile dichloride).

References Cited by the Examiner
UNITED STATES PATENTS

| | | | |
|---|---|---|---|
| 2,214,769 | 9/40 | Lipkin | 260—2 |
| 3,048,631 | 8/62 | Audrieth et al. | 260—2 |

NORMAN G. TORCHIN, *Primary Examiner.*
LOUISE P. QUAST, *Examiner.*